US011568395B2

(12) United States Patent
O'Sullivan et al.

(10) Patent No.: US 11,568,395 B2
(45) Date of Patent: Jan. 31, 2023

(54) SYSTEMS AND METHODS FOR USE IN FACILITATING NETWORK TRANSACTIONS

(71) Applicant: MASTERCARD INTERNATIONAL INCORPORATED, Purchase, NY (US)

(72) Inventors: Daniel Brian O'Sullivan, White Plains, NY (US); Michael S. Ameiss, Wentzville, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 254 days.

(21) Appl. No.: 16/287,484

(22) Filed: Feb. 27, 2019

(65) Prior Publication Data
US 2019/0266599 A1 Aug. 29, 2019

Related U.S. Application Data

(63) Continuation of application No. PCT/US2019/019542, filed on Feb. 26, 2019.

(60) Provisional application No. 62/636,586, filed on Feb. 28, 2018.

(51) Int. Cl.
*G06Q 20/38* (2012.01)
*G06Q 20/18* (2012.01)
*G06Q 20/20* (2012.01)

(52) U.S. Cl.
CPC ........... *G06Q 20/381* (2013.01); *G06Q 20/18* (2013.01); *G06Q 20/204* (2013.01)

(58) Field of Classification Search
CPC ........ G06Q 20/38; G06Q 20/10; G06Q 20/04; G06Q 20/20; G06Q 40/02; G06Q 20/381; G06Q 40/04; G06Q 20/18
See application file for complete search history.

(56) References Cited

U.S. PATENT DOCUMENTS

2004/0148255 A1 7/2004 Beck et al.
2005/0027648 A1 2/2005 Knowles et al.
2006/0229977 A1* 10/2006 Schleicher ......... G06Q 30/0601
705/39

(Continued)

FOREIGN PATENT DOCUMENTS

CA 2733033 A1 * 2/2010 ............. G06Q 20/24
WO WO99/50776 10/1999

(Continued)

*Primary Examiner* — Hao Fu
(74) *Attorney, Agent, or Firm* — Harness, Dickey & Pierce, P.L.C.

(57) ABSTRACT

Systems and methods are provided for facilitating network transactions. One exemplary method includes receiving, from a terminal, a request for a conversion option for a transaction to a payment account, where the request includes a transaction amount for the transaction in a first currency and an identifier associated with the payment account. The exemplary method also includes determining a charge rate for the payment account for conversion of the transaction amount to a second currency, determining the conversion option for the transaction in the second currency based on at least a conversion rate and the charge rate, and transmitting the conversion option to the terminal in response to the request.

15 Claims, 6 Drawing Sheets

(56) References Cited

U.S. PATENT DOCUMENTS

2008/0249933 A1\* 10/2008 Rethorn ................. G06Q 20/40
                                                              705/40
2016/0292654 A1   10/2016 Schleicher
2018/0144317 A1\*  5/2018 Murakami ............... G07D 9/00
2018/0182002 A1    6/2018 Simpson
2018/0330353 A1\* 11/2018 Prabhune ............. G06Q 20/102

FOREIGN PATENT DOCUMENTS

| WO | WO2009/112812 | 9/2009 |
| WO | WO2011/053718 | 5/2011 |
| WO | WO2016/203875 | 12/2016 |

\* cited by examiner

SYSTEMS AND METHODS FOR USE IN FACILITATING NETWORK TRANSACTIONS

CROSS-REFERENCE TO RELATED APPLICATIONS

This application claims the benefit of, and priority to, U.S. Provisional Application No. 62/636,586 filed on Feb. 28, 2018. This application is also a continuation of International PCT Application No. PCT/US19/19542 filed on Feb. 26, 2019, which also claims the benefit of, and priority to, said U.S. Provisional Application No. 62/636,586 filed on Feb. 28, 2018. The entire disclosure of each of the above-referenced applications is incorporated herein by reference.

FIELD

The present disclosure generally relates to systems and methods for use in facilitating network transactions.

BACKGROUND

This section provides background information related to the present disclosure which is not necessarily prior art.

Users are known to purchase various different products (e.g., goods and services, etc.) from merchants and to withdraw cash from banks or at automated teller machines (ATMs) through the use of payment accounts. Such users are also known to reside in regions, whereupon a portion of the payment account transactions performed by the users takes place in the regions of their residence, i.e., their native or home regions. In addition, from time to time, the users may travel to other regions, i.e., foreign regions, whereupon payment account transactions in the foreign regions may involve different currencies and/or extra fees.

When performing payment account transactions in foreign regions, the users may be invited, by point-of-sale (POS) or ATM terminals at corresponding merchants, banking institutions, etc., to effect the transactions in the user's native or home currencies rather than in local currencies of the foreign regions (a practice referred to as dynamic currency conversion (DCC)). For example, upon presenting payment devices to the POS terminals to initiate the transactions, payment account numbers (e.g., primary account numbers (PANs), etc.) may be used to determine the users' native regions and associated currencies. The POS terminals then invite the users to initiate the payment account transactions in the determined native currencies. This option is provided by the merchants, and/or banking institutions associated with the merchants (DCC providers), and often includes fees, mark-ups, and/or other charges. When the users accept the invitation/option, the payment account transactions are initiated in the native currencies of the users (as DCC transactions) in amounts equal to the transaction amounts in the merchants' currencies converted to the users' native currencies at rates set by the merchants and/or associated banking institutions (again, DCC providers), including the additional fees, mark-ups, and/or other charges. In turn, issuers of the payment accounts used in the transactions (again, DCC transactions) (and payment networks associated therewith) receive requests for the transactions in the native currencies and process the transactions (i.e., through authorization, clearing and settlement) in a conventional manner. In doing so, the issuers and/or payment networks may further apply one or more fees to the transactions as prescribed by applicable rules and regulations associated with the types and/or characters of the transactions and/or the accounts used therein (e.g., cross-border fees to account for the given transactions occurring in the foreign regions, etc.).

DRAWINGS

The drawings described herein are for illustrative purposes only of selected embodiments and not all possible implementations, and are not intended to limit the scope of the present disclosure.

Figure 1:
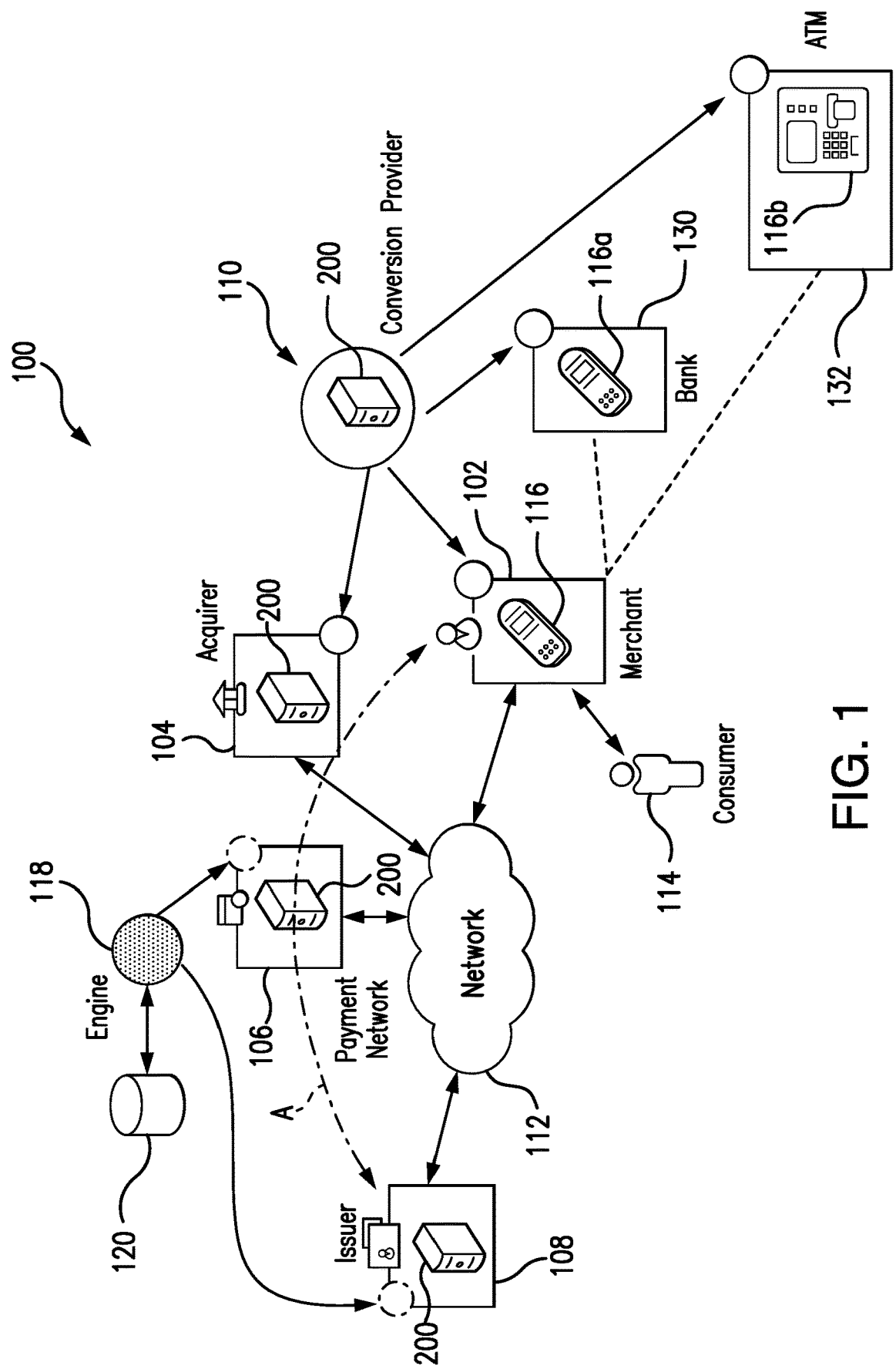
FIG. 1 illustrates an exemplary system of the present disclosure suitable for use in providing currency conversion options to users for transactions in certain regions, at point-of-sale (POS) terminals, automated teller machine (ATM) terminals, or other terminals used in initiating or facilitating the transactions.
Figure 3:
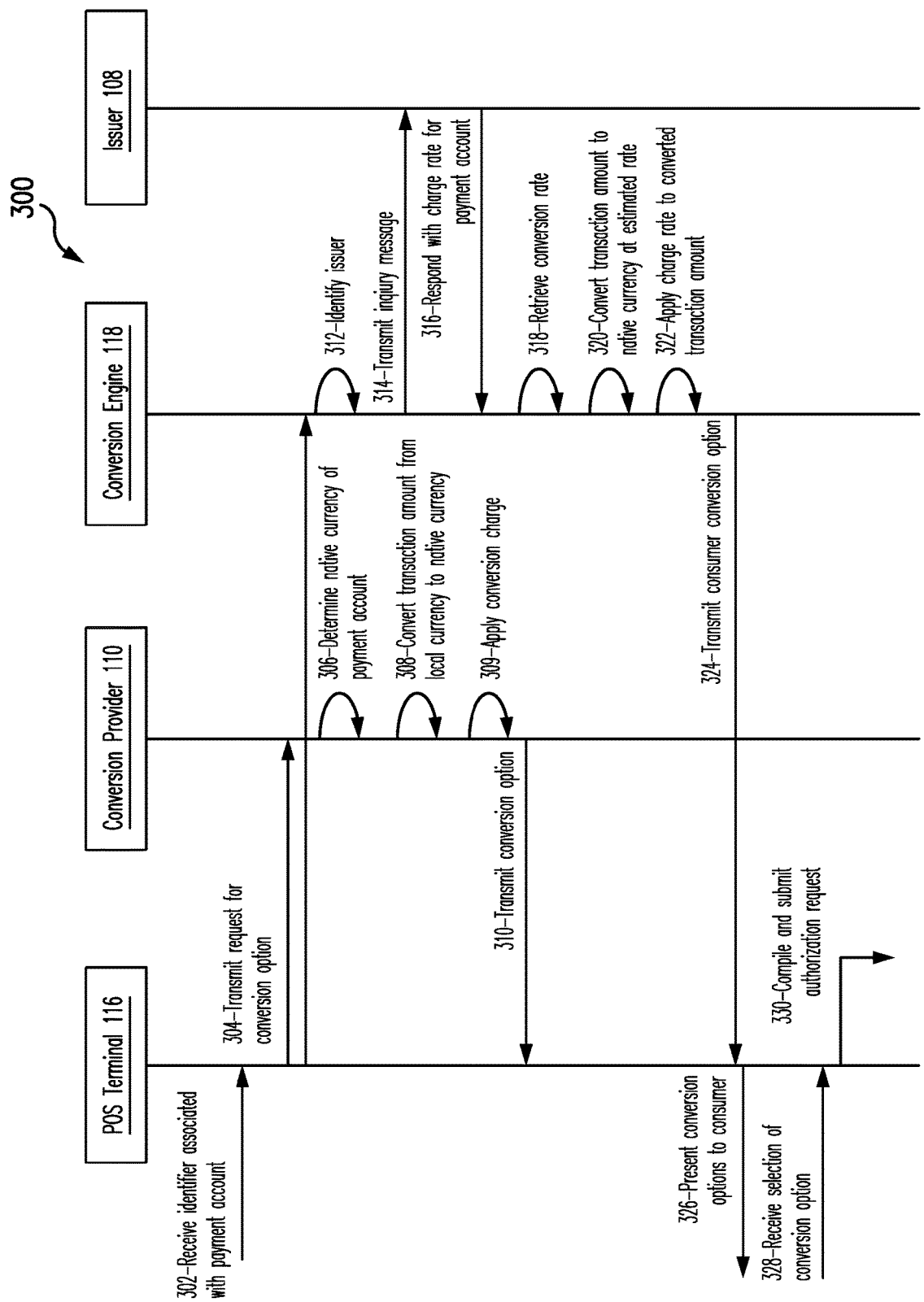
Figure 4:
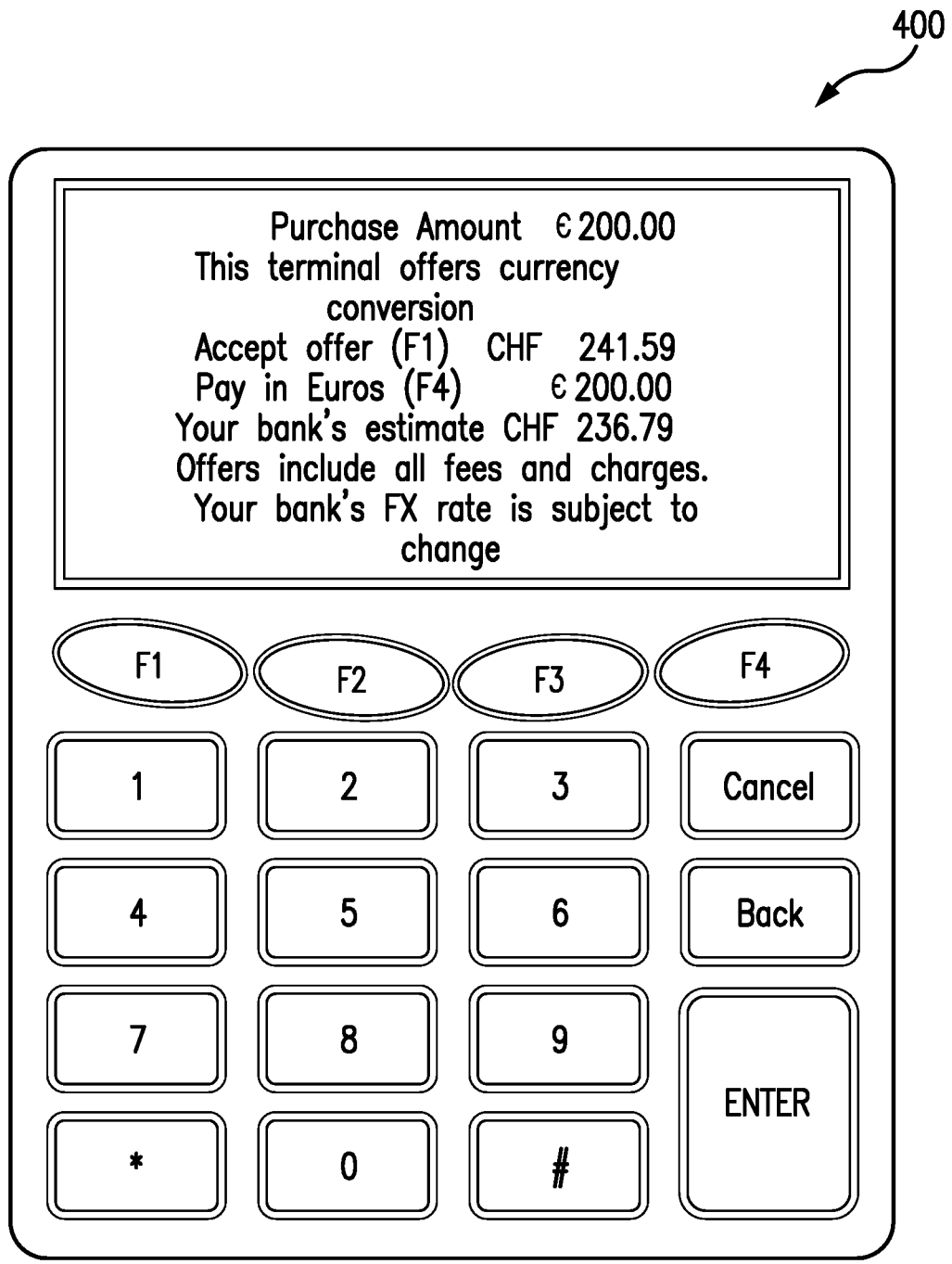
Figure 5:
Figure 6:
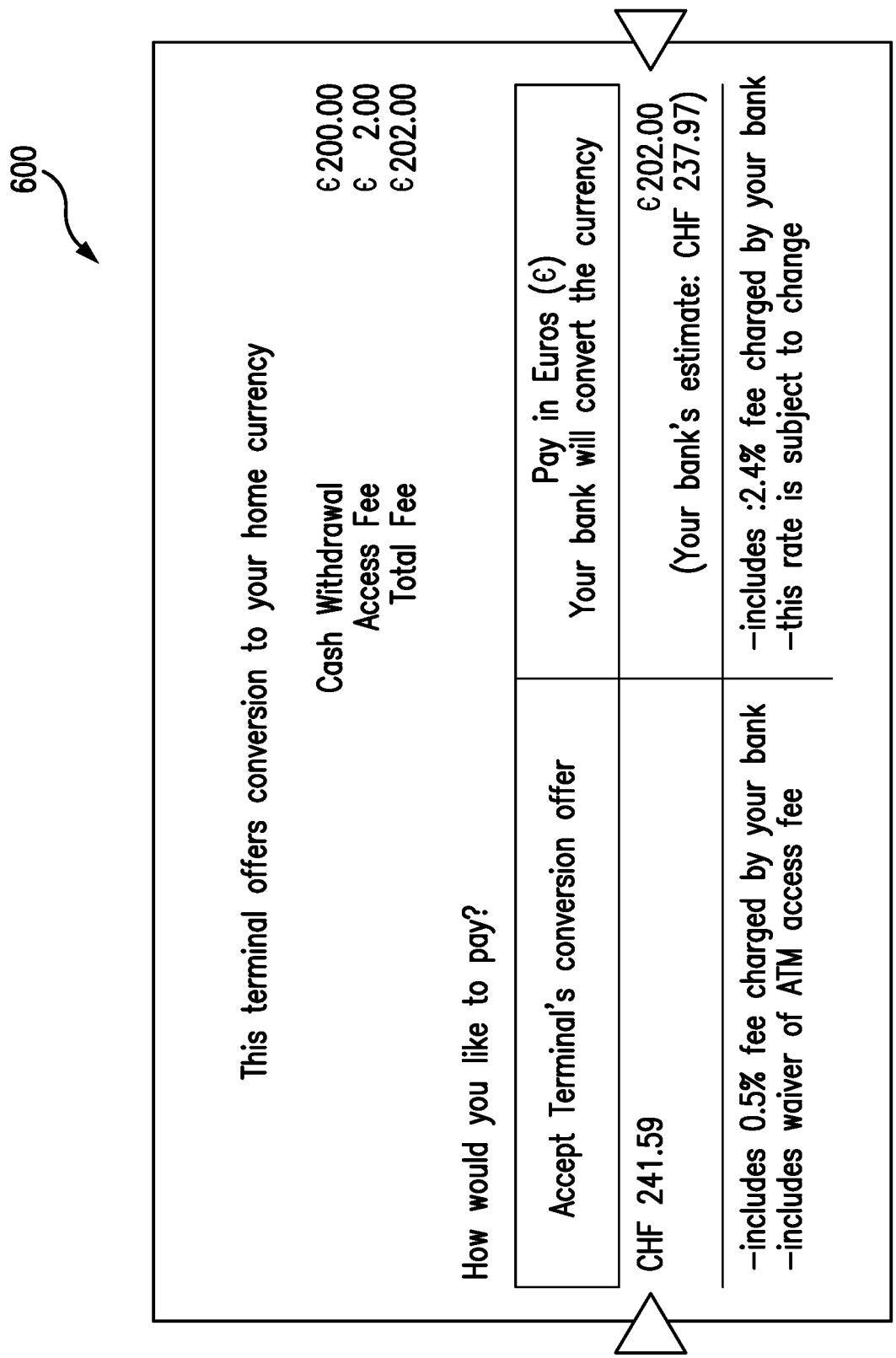

FIG. 3 is an exemplary method that may be implemented in the system of FIG. 1 for providing the conversion options to the users, at the POS terminals, the ATM terminals or other terminals, in connection with the transactions; and FIGS. 4-6 illustrate exemplary interfaces including multiple conversion options, which may be displayed to a user in connection with the system of FIG. 1 and/or the method of FIG. 3, as part of facilitating a transaction.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Consumers often purchase products from merchants through use of payment accounts in regions in which the consumers reside (i.e., in their native or home regions), as well as in other regions (i.e., foreign regions or not native regions). The consumers may also withdraw cash from banks or at automated teller machines (ATMs) through the use of their payment accounts. Often, currencies used in the native regions (i.e., native or home currencies) are different from currencies used in the foreign regions (i.e., local, foreign currencies), whereby currency conversions are involved in the payment account transactions in the foreign regions. While issuers of the consumers' payment accounts may coordinate the currency conversions in the authorization, clearing and settlement processes (i.e., as an issuer currency conversion), the consumers may be offered options, by the merchants and/or banks involved in the transactions or by banking institutions associated therewith, to initiate the transactions in the consumers' native currencies, whereby further currency conversions may be omitted (via dynamic currency conversion (DCC)). The consumers are typically offered this option at point-of-sale (POS) terminals and/or ATM terminals (broadly, terminals) used in the transactions, often without knowledge of currency conversion rates (FX rates) and/or fees imposed in the transactions by such option. In addition, prior to making the decision, consumers are often not informed of competing rates at which their issuing banks would convert the transactions into their native currencies. As such, the consumers may opt to pay in their native currencies, which are familiar, rather than in the local foreign currencies, even when (but without necessarily knowing) their issuing banks' conversions of the local foreign currencies may result in lower overall transaction amounts.

Uniquely, the systems and methods herein permit and/or provide an option to consumers to select between a DCC offer (i.e., a merchant-associated currency conversion) and an issuer-associated currency conversion for a given transaction, thereby permitting the consumers to select between like options (e.g., rather than between amounts in different currencies as is generally conventional). In particular herein, when a transaction is initiated by a consumer at a merchant or at an ATM or other bank (using a payment account associated with the consumer), a request for a conversion offer to be used in the transaction is provided to a conversion provider (or DCC provider) and also to an issuer of the consumer's payment account (and/or a payment network associated with the issuer). Each responds with a currency amount for the transaction, which is then provided to the consumer for selection, at a POS terminal or ATM terminal involved in the transaction. As such, the consumer is provided with multiple options of currency conversion, each generally provided in the same currency, which allows the consumer to select a lesser of the options (or otherwise if desired). In this manner, the POS terminal and/or ATM terminal used in the transaction is particularly leveraged (and, thus, specifically configured) to provide multiple currency conversation options, from different sources, thereby improving performance of the POS terminal and/or the ATM terminal (as a computing device) and also the consumer's experience (as a practical application of the conversions).

FIG. 1 illustrates an exemplary system 100 in which one or more aspects of the present disclosure may be implemented. Although the system 100 is presented in one arrangement, other embodiments may include systems arranged otherwise depending, for example, on processing of payment account transactions, currency conversion options, regional boundaries, privacy concerns, etc.

In the illustrated embodiment, the system 100 generally includes a merchant 102, an acquirer 104 associated with the merchant, a payment network 106, an issuer 108, and a conversion provider 110, each coupled to (and in communication with) a network 112. The network 112 may include, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. For example, network 112 may include multiple different networks, such as a private payment transaction network made accessible by the payment network 106 to the acquirer 104 and the issuer 108 and, separately, the public Internet, which is accessible as desired to the merchant 102, the payment network 106, the issuer 108, the conversion provider 110, and one or more various consumers in the system 100 (e.g., consumer 114, etc.), etc.

The merchant 102 in the system 100 is generally associated with products (e.g., goods and/or services, etc.) offered for sale to consumers and which may be purchased, as desired, by the consumers (including consumer 114). The merchant 102 may offer the products for sale and sell the products through a physical storefront (i.e., a brick-and-mortar location), or through one or more mobile locations, websites, etc. In the illustrated embodiment, the merchant 102 includes a POS terminal 116 associated therewith (and which is consistent with the computing device 200 of FIG. 2), through which payment account transactions for the purchase of the merchant's products by consumers may be initiated.

The conversion provider 110 in the system 100 may be a standalone entity, as shown in FIG. 1, or it may be included in the merchant 102 and/or the acquirer 104 associated with the merchant 102, as indicated by the arrowed lines. Whether included, or not, the conversion provider 110 is associated with (and is in communication with) the merchant 102 and is configured to provide conversion options (e.g., a DCC offer, etc.) for currencies in connection with the payment account transactions (as DCC transactions) performed at the merchant 102, as describe in detail herein.

Further, the consumer 114 in the system 100 is associated with a payment account, which is issued to the consumer 114 by the issuer 108. The consumer 114 may rely on the payment account to fund transactions with the merchant 102 (and/or with other merchants in the system 100, but not shown, or other merchants) for the products offered for sale by the merchant 102. In connection therewith, the payment account may include, for example, a credit account, a debit account (e.g., a checking account or savings account, etc.), or a prepaid account, etc.

In addition, the system 100 may also optionally include a banking institution 130 (e.g., a local bank branch, etc.) and an ATM 132 (in addition to the merchant 102 in the system 100 or in lieu of the merchant 102 in the system 100, as is indicated by the dotted lines in FIG. 1). The banking institution 130 and the ATM 132 are generally associated with allowing consumers (including the consumer 114) to access and/or withdraw money from accounts associated with the consumers, when desired. For example, the banking institution 130 may include a terminal 116a associated therewith (and which is consistent with the computing device 200 of FIG. 2), through which consumers may initiate account transactions (generally within the banking institution 130) to withdraw money from their accounts. Similarly, the ATM 132 may be a terminal 116b (e.g., an ATM terminal, etc.) (consistent with the computing device 200 of FIG. 2), through which consumers may initiate account transactions to withdraw money from their accounts. In either case, the terminals 116a and 116b are specifically configured to operate in the same manner as the terminal 116 in order to allow for currency conversion options as described herein (such that, while the following description is generally directed to the terminal 116, it should be considered to equally apply to the terminals 116a and 116b). What's more, while not expressly shown, the banking institution 130 and the ATM 132 (and/or the corresponding terminals 116a and 116b) may also be coupled to and in communication with the network 112 (e.g., in the same manner described for the merchant 102 and the terminal 116, etc.).

While one merchant 102, one acquirer 104, one payment network 106, one issuer 108, one conversion provider 110, one consumer 114, one banking institution 130, and one ATM 132 are illustrated as included in the system 100 of FIG. 1, it should be appreciated that any number of these entities and/or persons (and their associated components) may be included in the system 100, or may be included as a part of systems in other embodiments, consistent with the present disclosure.

Figure 2:
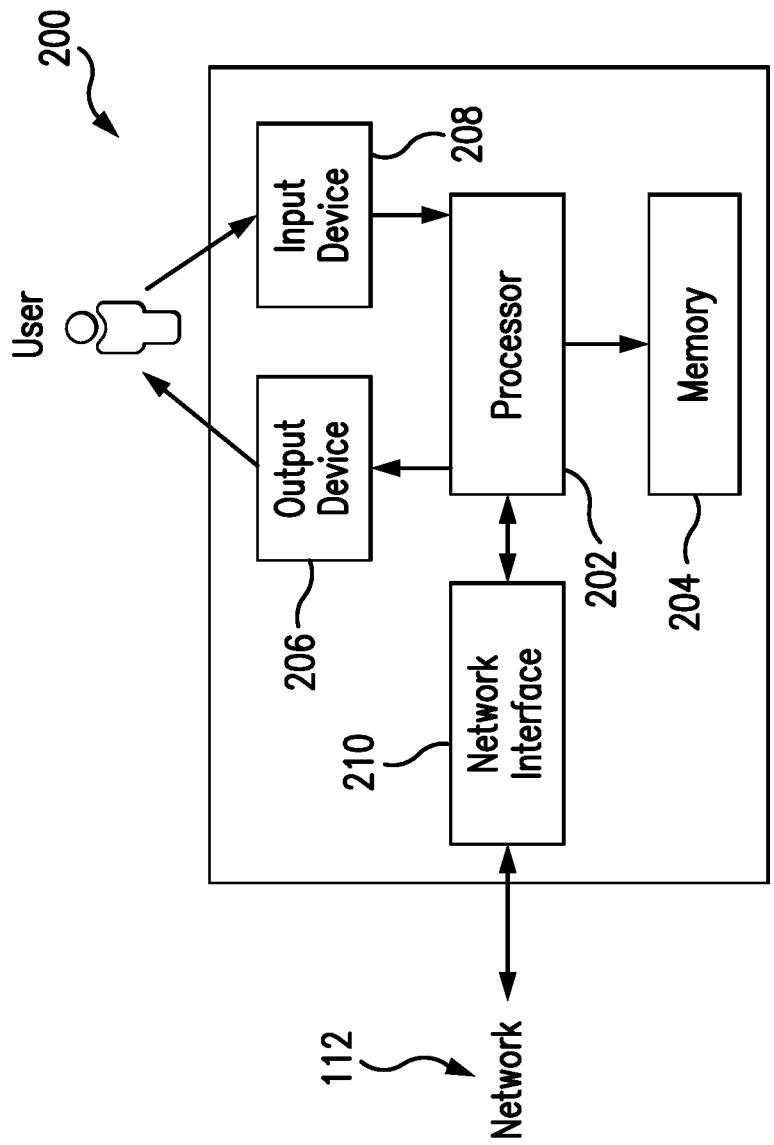
FIG. 2 is a block diagram of a computing device that may be used in the exemplary system of FIG. 1.

FIG. 2 illustrates exemplary computing device 200 that can be used in the system 100. The computing device 200 may include, for example, one or more servers, workstations, personal computers, laptops, tablets, smartphones, PDAs, POS devices, etc. In addition, the computing device 200 may include a single computing device, or it may include multiple computing devices located in close proximity or distributed over a geographic region, so long as the computing devices are specifically configured to function as described herein. In particular, in the exemplary system 100 of FIG. 1, each of the acquirer 104, the payment network 106, the issuer 108, and the conversion provider 110 are illustrated as including, or being implemented in, computing device 200, coupled to the network 112. In addition, the POS terminal 116 associated with the merchant 102, as well as the terminals 116a and 116b associated with the banking institution 130 and the ATM 132, respectively, may each be considered a computing device consistent with the computing device 200. What's more, the merchant 102, the banking institution 130, and/or the ATM 132 may further include and/or be implemented in at least one computing device consistent with the computing device 200. That said, the system 100 should not be considered to be limited to the computing device 200, as described below, as different computing devices and/or arrangements of computing devices may be used. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, transaction data, conversion rates, charges, currency and/or conversion options, regional boundaries/distinctions, and/or other types of data (and/or data structures) suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 that is performing one or more of the various operations herein (e.g., the performance of any one of the POS terminal 116 or the terminals 116a or 116b in its/their ability to provide the currency options to consumers, the performance of conversion engine 118, etc.). It should be appreciated that the memory 204 may include a variety of different memories, each implemented in one or more of the functions or processes described herein.

In addition in the exemplary embodiment, the computing device 200 includes an output device 206 that is coupled to (and is in communication with) the processor 202. The output device 206 outputs information (e.g., conversion options, etc.), either visually or audibly, to a user of the computing device 200, for example, the consumer 114, users associated with other parts of the system 100, etc. Various interfaces (e.g., as defined by FIGS. 4-6, etc.) may also be displayed at computing device 200, and in particular at output device 206, to display such information. The output device 206 may include, without limitation, a presentation unit such as a liquid crystal display (LCD), a light-emitting diode (LED) display, an organic LED (OLED) display, an "electronic ink" display; speakers; another computer; etc. In some embodiments, the output device 206 may include multiple devices.

The computing device 200 also includes an input device 208 that receives inputs from the user of the computing device 200 (i.e., user inputs) such as, for example, selections of conversion options, etc. The input device 208 is coupled to (and is in communication with) the processor 202 and may include, for example, a keyboard, a pointing device, a mouse, a stylus, a touch sensitive panel (e.g., a touch pad or a touch screen, etc.), another computing device, and/or an audio input device. Further, in various exemplary embodiments, a touch screen, such as that included in a tablet, a smartphone, or similar device, may behave as both the output device 206 and the input device 208.

In addition, the illustrated computing device 200 also includes a network interface 210 coupled to (and in communication with) the processor 202 and the memory 204. The network interface 210 may include, without limitation, a wired network adapter, a wireless network adapter (e.g., a near field communication (NFC) adapter, a Bluetooth adapter, etc.), a mobile network adapter, or other device capable of communicating to/with one or more different networks, including the network 112. Further, in some exemplary embodiments, the computing device 200 may include the processor 202 and one or more network interfaces (including the network interface 210) incorporated into or with the processor 202.

Referring again to FIG. 1, the system 100 includes conversion engine 118 and a data structure 120 coupled thereto (and in communication therewith). The conversion engine 118 is specifically configured, by executable instructions, to perform one or more of the operations described herein (e.g., effect an issuer-based currency conversion offer, etc.). In connection therewith, the conversion engine 118 and the data structure 120 may each be considered a computing device consistent with computing device 200. While the conversion engine 118 and the data structure 120 are illustrated as separate parts of the system 100 in FIG. 1, one or both may be incorporated into and/or located at one or more other parts of the system 100 (e.g., at the payment network 106 and/or at the issuer 108 as indicated by the arrowed lines in FIG. 1, etc.). In addition, while the data structure 120 is illustrated as separate from the conversion engine 118 in the system 100, in other embodiments the data structure 120 may be included, or integrated, in the conversion engine 118, for example, in memory 204 therein, etc.

With that said, in operation of the system 100 (with regard to the merchant 102 and the POS terminal 116), when the consumer 114 attempts a transaction at the merchant 102, the consumer 114 provides a payment device (associated with his/her payment account) to the POS terminal 116, which is configured to capture a payment account number (e.g., a PAN, etc.) for the consumer's payment account from the payment device. In particular, the POS terminal 116 may read the PAN from a magnetic strip on the payment device or read the PAN from a chip embedded in the payment device (e.g., via the input device 208 of the POS terminal 116, etc.), or further capture the PAN wirelessly from the payment device (e.g., via the network interface 210 of the POS terminal 116, etc.). Regardless of how the PAN is captured, the POS terminal 116 is configured to recognize the native or home region of the payment account (and/or the consumer 114), based on the PAN (or, simply, determine if a currency conversion is implicated based thereon). And, when the native region is different from the local region of the POS terminal 116 (or if the currency conversion is implicated), the POS terminal 116 is configured to transmit a conversion request to the conversion provider 110 and to the conversion engine 118 (via network 112). The conversion request may include, for example, an amount of the transaction, the currency of the merchant 102 (or the banking institution 130 or ATM 132 when involved), an identifier of the native currency and/or the native region for the consumer's payment account, and/or a part of the consumer's PAN, and may further include a location of the merchant 102 (or the banking institution 130 or ATM 132 when involved) and one or more identifiers of the merchant 102 and/or the acquirer 104 (or the banking institution 130 or ATM 132 when involved), an indication of whether the transaction is face-to-face or not, and a merchant category code, etc. What's more, the conversion request transmitted to the conversion provider 110 and the conversion request transmitted to the conversion engine 118 may be the same (and may include the same information) or may be different, for example, depending on requirements of the conversion provider 110 and conversion engine 118, etc.

It should be appreciated that the POS terminal 116 may transmit the conversion request to the conversion provider 110 and/or the conversion engine 118, and the conversion provider 110 and/or the conversion engine 118 may transmit the conversion offer back to the POS terminal 116, via an applicant programming interface (API) or through another suitable network-based mechanism. In other embodiments, for example, the POS terminal 116 may be configured to communicate with the conversion provider 110 and/or the conversion engine 118, and vice-versa, via the payment network 106, such that the conversion request and the conversion option are provided through one or more ISO 8583 messages or equivalents (e.g., similar to an account status inquiry message, etc.), or other through messages according to one or more other ISO standards, etc.

In response, the conversion provider 110 is configured to receive the conversion request, from the POS terminal 116, and to determine a conversion option (or conversion offer) for the transaction, which includes an amount for the transaction in the native currency of the payment account (as indicated by the PAN) (as converted from the local currency). The amount determined by the conversion provider 110 may include the amount of the transaction converted by a current and/or available conversion rate (FX rate) (from the local currency to the native currency), plus one or more charges (e.g., a flat fee and/or a percentage of the amount of the transaction (e.g., 2%, 3%, 7%, etc.), etc.). In so doing, the conversion rate may be identified, by the conversion provider 110, from a rate table associated therewith (e.g., stored in memory 204 associated with the conversion provider 110, etc.), upon identifying the native or home region (or currency) of the consumer's payment account (and/or the consumer 114), where the rate table may be updated daily (or at any other desired interval). Once the conversion option is determined, the conversion provider 110 is configured to provide the conversion option (in the consumer's native or home currency) back to the POS terminal 116. As indicated above, in some embodiments, the conversion provider 110 may be included in the merchant 102 (and, more particularly, in the POS terminal 116). As such, in these embodiments, the POS terminal 116 may be viewed as being configured to determine the conversion option for the transaction generally internally (in the same manner described above).

Similarly, the conversion engine 118 is configured to receive the conversion request, from the POS terminal 116, and to identify the payment account associated with the request and/or the issuer 108 of the payment account. Once identified, the conversion engine 118 is configured to retrieve, from the data structure 120, an applicable charge for the currency conversion for the transaction, as associated with the consumer's payment account and/or the issuer 108 (e.g., taking into account the transaction amount and the local currency of the merchant 102 as determined from the request, etc.). In addition, the conversion engine 118 is configured to retrieve, again from the data structure 120 (e.g., via a rate table stored therein, etc.), a present conversion rate between the local currency of the transaction and the native currency of the consumer's payment account and/or funds loaded to the payment account. And, the conversion engine 118 applies any additional fees and/or charges associated with and/or implemented by the consumer's payment account and/or the issuer 108 for such conversion. Then, based on the applicable charge, the conversion rate, the amount of the transaction, and any additional fees/charges, the conversion engine 118 is configured to determine a conversion option for the transaction, which is reflected in the native currency for the consumer's payment account. In turn, the conversion engine 118 is configured to transmit the conversion option (in the native currency) back to the POS terminal 116.

Thereafter in the system 100, the POS terminal 116 is configured to receive the conversion options from each of the conversion provider 110 and the conversion engine 118. The POS terminal 116 is configured to next display the conversion options to the consumer 114, via the output device 206, for example, at the POS terminal 116, and to solicit a selection of one of the conversion options. When the consumer 114 selects the conversion option from the conversion engine 118 (based generally on conversion data associated with the issuer 108 of the consumer's payment account), by selecting the option at the input device 208 of the POS terminal 116, the POS terminal 116 is configured to generate an authorization request for the transaction, which includes the transaction amount in the local currency and a currency identifier for the local currency. The POS terminal 116 is configured to then communicate the authorization request to the acquirer 104 (along path A in FIG. 1).

In turn, the acquirer 104 communicates the authorization request with the issuer 108 along path A, generally through the payment network 106, such as, for example, through the MasterCard®, VISA®, Discover®, or American Express® payment network, etc. Upon receipt, the issuer 108 is configured to convert the transaction amount to the native currency associated with the consumer's payment account (e.g., based on present currency conversions, etc.), to apply the applicable charge(s) for the conversion (and other applicable charges) (generally consistent with the conversion option provided by the conversion engine 118), and then to determine if the consumer's payment account is in good standing and/or if there is sufficient funds and/or credit to cover the transaction. If approved, an authorization reply (indicating the approval of the transaction) is transmitted by the issuer 108 back to the merchant 102, in the above example, again along path A, thereby permitting the merchant 102 to complete the transaction. The transaction is later cleared and/or settled by and between the merchant 102, the acquirer 104, and the issuer 108 (in the consumer's native currency taking into account the details of the selected conversion option relating to the issuer 108 and the conversion engine 118).

Conversely, when the consumer 114 selects the conversion option from the conversion provider 110 (e.g., a DCC option, etc.), by an input at the input device 208 of the POS terminal 116, the POS terminal 116 is configured to update the transaction amount with the amount included in the conversion option, and to generate an authorization request for the transaction based on the updated amount (in the native currency for the consumer's payment account) along with a currency identifier for the native currency. As above, the POS terminal 116 is configured to then communicate the authorization request to the acquirer 104, along path A. And, the acquirer 104 communicates the authorization request to the issuer 108, through the payment network 106, again along path A. Upon receipt, the issuer 108 is confirmed to determine (without converting the currency (unless the conversion provider 110 and/or POS terminal 116 selected/indicated an incorrect native currency in the authorization request), but still including any applicable charges, etc.) if the consumer's payment account is in good standing and/or if there is sufficient funds and/or credit to cover the transaction. In response, issuer 108 is configured to proceed as described above to authorize, clear and settle the transaction in the native currency, as appropriate.

Again, the above description equally applies to a transaction by the consumer 114 at the terminal 116a associated with the banking institution 130 or a transaction by the consumer 114 at the terminal 116b associated with the ATM 132. In either case, the terminals 116a and 116b are configured to operate in the same manner as the terminal 116 described above, for example, with regard to capturing payment account information for the consumer's payment account, generating and transmitting a conversion request to the conversion provider 110 and the conversion engine 118, displaying conversion options to the consumer 114, receiving a selections of one of such options from the consumer 114, etc.

FIG. 3 illustrates an exemplary method 300 for use in providing currency conversion options to consumers at POS terminals associated with merchants (and/or at ATM terminals or other banking terminals, etc.), in connection with transactions by the consumers at the merchants. The exemplary method 300 is described with reference to the system 100, and the conversion provider 110, the POS terminal 116 associated with the merchant 102, and the conversion engine 118 thereof. Further reference is also made to the computing device 200. However, it should be understood that the methods herein are not limited to the system 100 or the computing device 200, as the method 300, for example, may be implemented, at least in part, in other parts of suitable systems, or in multiple other computing devices or systems. Likewise, the systems and the computing devices herein should not be understood to be limited to the exemplary method 300. Further, and as described above for the system 100, the following description of the method 300 equally applies to a transaction by the consumer 114 at the terminal 116a associated with the banking institution 130 or a transaction by the consumer 114 at the terminal 116b associated with the ATM 132 (whereby the description of the terminal 116 below equally applies to the terminals 116a and 116b).

In the exemplary method 300, the consumer 114 attempts a payment account transaction at the merchant 102 for a product with a cost of € 200.00 (where the local currency for the merchant 102 is Euros (€), and where the merchant 102 is located in a foreign region (e.g., Country B, etc.) as compared to the native or home region (e.g., Country A, etc.) of the consumer 114 and his/her payment account (and where the consumer's native or home currency is Swiss Francs (CHF)). In connection therewith, the consumer 114 presents the payment device associated with his/her payment account to the merchant 102, and in particular, to the POS terminal 116 by swiping, contacting, waving, etc., the payment device (e.g., via an input device 208 and/or network interface 210 thereof). In response, at 302, the POS terminal 116 receives an identifier associated with the consumer's payment account, such as, for example, a PAN, etc., along with an expiration date for the payment device, a card verification code (CVC) for the payment device, etc.

In turn, the POS terminal 116 compiles and transmits, at 304, a request for a currency conversion quote (or a conversion request) to each of the conversion provider 110 and the conversion engine 118. In particular, transmitting the request to the conversion provider 110 may include transmitting the request via an API provided, for example, by the conversion provider 110, the payment network 106, another entity, etc. However, the request may alternatively be transmitted by other means, for example, other network connections (e.g., via BankNet, etc.), etc. And, transmitting the request to the conversion engine 118 may include transmitting, by the POS terminal 116, the request via an API provided, for example, by the conversion engine 118, the payment network 106, another entity, etc. However, the request may again be transmitted by other means, for example, other network connections (e.g., via BankNet, etc.), etc. In any case, the request includes, generally (for both the conversion provider 110 and the conversion engine 118 in this example), at least the PAN (or a part thereof) for the consumer's payment account and the amount of the transaction in the merchant's local currency (i.e., € 200.00), and may further include any additional information typically included in an authorization request (or pre-authorization request) for the transaction, etc. For example, the conversion request may also include an identifier associated with the merchant 102 and/or the acquirer 104, a designation of a location of the merchant 102 (e.g., in Country B, etc.), a designation of the local currency for the merchant 102 (i.e., Euros), etc.

Upon receipt of the conversion request, the conversion provider 110 determines, at 306, a native or home currency for the payment account involved in the transaction based on the PAN (or part thereof) included in the request. For example, the PAN includes a BIN (or bank identification number), which is country specific. As such, in this example, where the payment account is issued to the consumer 114 by issuer 108 in Country A, the BIN included in the PAN for the payment account will be indicative of Country A. Conversely, a payment account issued by the issuer 108 to a consumer in Country B will include, generally, a different BIN indicative of Country B. With that in mind, in one or more embodiments, the conversion provider 110 may access a look-up table or other data structure included in the conversion provider 110 and search for the BIN associated with the given transaction (or the PAN, or other part thereof), identify the issuing country of the payment account based on the BIN, and then identify the native currency based on the identified country. Alternatively, the data structure included in the conversion provider 110 may provide a cross-reference between BINs and native currencies, whereby intermediate identification of the issuing country associated with the BIN may be omitted. In any case, in this example, the conversion provider 110 identifies, directly or indirectly, the native currency for the consumer's payment account to include Swiss Francs (CHF).

Thereafter, the conversion provider 110 converts, at 308, the amount of the transaction from the local currency (as included in the conversion request) to the determined native or home currency. As such, in this example, the conversion provider 110 converts the amount of the transaction from € 200.00 to CHF 230.09 (based on a current or other conversion rate, etc.). The conversion provider 110 further applies, at 309, a conversion charge to the converted amount (in the native currency), as a fee for the conversion service. In this example, the charge is about 4.5% of the purchase amount, or CHF 10.29. And, in so doing, the conversion provider 110 comes to a conversion option for the transaction, which in this example is an amount of CHF 240.38. The conversion provider 110 then transmits, at 310, the conversion option back to the POS terminal 116. It should be appreciated that in other embodiments, the conversion provider 110 may apply the conversion charge to the transaction amount (in the local currency) before the conversion of the transaction amount from the local currency to the native currency (whereby the transaction amount combined with the conversion charge is then converted from the local currency to the native currency).

Separately in the method 300, upon receipt of the conversion request, the conversion engine 118 determines a charge rate for conversion of the transaction amount from the local currency of the transaction to the native currency of the consumer's payment account. In particular, the conversion engine 118 identifies, at 312, the issuer 108 associated with the consumer's payment account used in the transaction and transmits, at 314, an account status inquiry message to the issuer 108 (e.g., a pre-authorization request, etc.). The status inquiry message includes a request for the charge rate for the currency conversion for the payment account. In turn, the issuer 108 responds, at 316, with the charge rate for the currency conversion for the payment account. In addition to the charge rate (or potentially, as an alternative to the charge rate), the issuer 108 may respond with and/or provide to the conversion engine 118 one or more additional fees associated with the transaction (e.g., Foreign Transaction Fees (FTF) (e.g., cross-border fees, etc.), etc.) (e.g., as prescribed by agreement with the consumer 114 or other entity/person at issuance of the payment account, etc.). The additional fees are generally applicable to the transaction for the conversion option from the conversion provider 110. In one specific example, the conversion option response from the issuer 108 may include an ISO 8583 message in which the currency of the consumer's account, the additional fees, and the issuer's charge rate are included in one or more of data element (DE) 6, DE 38 and DE 28, for example, in the message. Of course, other data elements in such a message may be employed in other examples.

It should be appreciated that the data structure 120 may also include charge rates (and/or additional fees) for different payment accounts associated with the payment network 106 and/or the issuer 108, and that the charge rates may be included in the data structure 120 for different account ranges, for example, or otherwise. In such an embodiment, the conversion engine 118 may directly retrieve the desired charge rate for the consumer's payment account from the data structure 120, thereby avoiding an inquiry message to the issuer 108 to request the charge rate.

Upon receipt of the charge rate from the issuer 108 (or from the data structure 120), the conversion engine 118 determines the conversion option based on the currency conversion that would occur if the consumer 114 relied on the issuer 108 for the conversion (e.g., if the transaction proceeded in the local currency, etc.). In connection therewith, in this exemplary embodiment, the conversion engine 118 retrieves, at 318, a conversion rate for the transaction amount from the data structure 120 (e.g., a conversion rate for a current clearing cycle, an estimated conversion rate for a clearing cycle that would involve the underlying transaction, etc.) or from another suitable source, for converting the local currency to the native currency of the consumer's payment account (where the native currency is determined based on identification of the issuer 108 and/or is requested from the issuer 108, etc.). In any case, the conversion rate retrieved by the conversion engine 118 is generally an estimate, as it will likely vary from the conversion rate actually applied during clearing. Then, at 320, the conversion engine 118 converts the amount of the transaction from the local currency to the native or home currency, as an estimate (since the conversion rate may change from the time of determining the conversion option up to the time of clearing/settling the transaction, based on the retrieved conversion rate (at the time of the transaction, as estimated at the time of clearing, etc.)). The conversion engine 118 also applies, at 322, the charge rate (as received from the issuer 108 and/or from the data structure 120) to the converted transaction amount (in the consumer's native currency). In this example, the issuer 108 charges an additional 0.5% fee (e.g., a cross-border fee associated with the issuer 108, etc.), and then the charge rate received from the issuer 108 is 2.4%. As such, the conversion engine 118 comes to a conversion option of CHF 236.79 (i.e., a currency conversion of € 200.00 to CHF 230.09, plus the additional fee of 0.5% of 230.09 and then the charge rate of 2.4% thereof).

The conversion engine 118 then transmits, at 324, the conversion option to the POS terminal 116 (e.g., CHF 237.97 in the above example, etc.) (and potentially, any additional charges and fees for the transaction, as received from the issuer 108, and/or an indication of such additional charges and/or fees (e.g., an indication that the conversion option includes an additional FTF of 0.5% and a charge rate of 2.4%, etc.)). In connection therewith, for example, the conversion engine 118 may transmit the consumer's billing currency (e.g., Swiss Francs (CHF), etc.), the conversion option, and any additional charges and/or fees assessed by the issuer 108 and to be included in the conversion option displayed to the consumer 114 (e.g., an indication that the conversion option includes the additional fee of 0.5% associated with the issuer 108 and a charge rate of 2.4%, etc.). Or, if proper at this point in the method 300 (and as described in various examples herein), the conversion engine 118 may instead transmit a message stating conversion is not available or cannot be provided.

It should be appreciated that, occasionally in the method 300, a PAN or part thereof may be indicative of a currency specific to the region of the issuer 108, but not indicative of a native currency of the consumer's payment account. Specifically, for example, a prepaid card may be issued from the issuer 108 in Country A (having a currency of Swiss Francs (CHF)). When the consumer 114 anticipates travel to Country B, though, the consumer 114 may load funds to the prepaid card, in the local currency of Country B, i.e., Euros in the above example. As such, when the conversion provider 110 determines a conversion rate for a transaction performed by the consumer 114 using the prepaid card in Country B (e.g., based on a BIN for the prepaid card, etc.), it does so based on an incorrect native currency of the corresponding payment account (i.e., the conversion provider 110 may understand that a currency conversion is necessary where, in actuality, none is required). As a result, the consumer 114 may, potentially, be charged by the conversion provider 110 for a conversion of an amount of the transaction (to Swiss Francs) and then be charged again, by the issuer 108, for conversion (since the funds in the payment account are in Euros). Conversely, while it is possible that the conversion engine 118 may rely on the PAN (or part thereof) to determine a native currency of the payment account, the conversion engine 118 may determine the native currency by reference to the payment device's billing currency on file with the issuer 108 (and/or the payment network 106 affiliated with the issuer 108). As such, the conversion engine 118 may be informed of the correct native currency for the prepaid card in this example by the issuer 108 (while the conversion provider 110 is not), and may provide a conversion option in the correct currency for the prepaid card (and which will then likely provide a lower estimated option for the purchase than provided by the conversion provider 110, whereby the potential of the unnecessary conversion is avoided by selection of the lower estimated option).

That said, from time to time, the conversion provider 110 and/or the conversion engine 118 may respond to the conversion request, transmitted by the POS terminal 116 (at 304), with a reply message indicating that no conversion is required or permitted. In so doing, a corresponding message maybe displayed to the consumer 114 at the POS terminal 116, or the consumer 114 may simply not receive any conversion options (with the transaction then proceeding in a conventional manner).

With continued reference to FIG. 3, next in the method 300, the POS terminal 116 receives the currency conversion options from each of the conversion provider 110 and the conversion engine 118, and then, presents the conversion options (e.g., at the output device 206 of the POS terminal 116 or otherwise, etc.), at 326, to the consumer 114. In this exemplary embodiment, in connection with presenting the conversion option received from the conversion provider 110, the POS terminal 116 alters the conversion option received from the conversion provider 110 to include the additional fee identified by the conversion engine 118 (as provided from the issuer 108, for example, the foreign transaction fee of 0.5% in the above example) to provide an accurate conversion option (i.e., so that both options are inclusive of the additional charges from the issuer 108 that will result from actual clearing of the transaction, etc.). As can be appreciated, this ability of the POS terminal 116 to alter or update the conversion option received from the conversion provider 110 may allow for the POS terminal 116 to provide more accurate representations of payments to the consumer 114, whereby the consumer 114 may not be surprised when the transaction is ultimately cleared, etc. In the above example, the issuer 108 applies the additional foreign transaction fee of 0.5% such that the resulting conversion option for the conversion provider 110, as determined by the POS terminal 116, is then CHF 241.59 (i.e., CHF 240.38 increased by a fee of 0.5% for the issuer 108 to get to the CHF 241.59). That said, in other embodiments, the additional fees may be presented along with (but separate from) the conversion option for the conversion provider 110 (or even, potentially, not provided to the consumer 114 at all, for example, when not provided from the issuer 108 or otherwise).

In connection therewith, FIG. 4 illustrates an exemplary interface 400 that may be displayed to the consumer 114 at the POS terminal 116 in order to present the different conversion options. In particular in this example, the POS terminal 116 displays, via the interface 400, the conversion option of CHF 236.79 received from the conversion engine 118 (and the issuer 108) and the conversion option of CHF 241.59 received from the conversion provider 110 (as associated with the merchant 102 and/or the acquirer 104). In addition, FIG. 5 illustrates an alternative exemplary interface 500 that may be displayed to the consumer 114 at the POS terminal 116 in order to present the different conversion options. Again in this example, the POS terminal 116 displays, via the interface 500, the conversion option of CHF 236.79 received from the conversion engine 118 (and the issuer 108) and the conversion option of CHF 241.59 received from the conversion provider 110 (as associated with the merchant 102 and/or the acquirer 104). As can be seen, in the two interfaces 400 and 500 different details of the conversion rates (including different levels of indications of the fees being charged by the issuer 108, etc.) may be provided for review by the consumer 114. In both instances, though, the consumer 114 is presented with two options for proceeding with the underlying transaction.

In turn in the method 300, the conversion engine 118 receives, at 328, a selection of one of the conversion options from the consumer 114 (via the input device 208 of the POS terminal 116) (e.g., a selection of the option to pay in Euros in the above example as the local currency (as this option provides the lowest overall cost to the consumer 114), etc.). Then, in response to the selection, the POS terminal 116 compiles and submits, at 330, an authorization request for the transaction in the local currency, i.e., in Euros in the above example, (or in the local currency) to acquirer 104 and on to the issuer 108, via the payment network 106 (as generally described above in the system 100). In general, it is expected, because the options are both in the same currency (generally, the native currency of the consumer's payment account), the consumer 114 will select the less expensive of the options, which in this example is the conversion option associated with the conversion engine 118. As such, upon receipt of the selection from the consumer 114 of the conversion option from the conversion engine 118, the issuer 108 applies the conversion charges associated therewith (again, in the manner described above in the system 100).

And again, the above description of the method 300 applies to a transaction by the consumer 114 at the terminal 116a associated with the banking institution 130 or a transaction by the consumer 114 at the terminal 116b associated with the ATM 132. In connection therewith, FIG. 6 illustrates an exemplary interface 600 that may be displayed to the consumer 114 at the terminal 116b of the ATM 132 in order to present the different conversion options to the consumer 114 where the transaction includes a cash withdrawal from the consumer's payment account of € 200.00. In particular in this example, the terminal 116b displays, via the interface 600, a conversion option of CHF 237.97 received from the conversion engine 118 (and the issuer 108) and a conversion option of CHF 241.59 received from the conversion provider 110 (as associated with the ATM 132, etc.). The conversion option received from the conversion engine 118, in this example, includes an additional € 2.00 access fee associated with the ATM 132 (whereby the resulting conversion option of CHF 241.59 is based on conversion of € 202.00 in the same manner described above in the method 300 (instead of € 200.00)). And, the conversion option of CHF 241.59 received from the conversion provider 110 is determined in the same manner described above in the method 300 (based on the underlying transaction amount of € 200.00, which in this example excludes the € 2.00 access fee).

In view of the above, the systems and methods herein permit terminals to provide multiple conversion options to consumers in connection with transactions performed by the consumers in currencies different from those native to the consumers' payment accounts, whereby the consumers are able to select among the different options for payment. In general, the methods and system herein thus provide for competition in currency conversion, which may provide for cost savings and efficiencies at the POS terminals. Previously, the consumers were merely offered options to pay either in known currencies (e.g. native currencies, etc.) or unknown currencies (e.g., local currencies, etc.) for certain transactions at the terminals, with no indications of the relation of the two currencies to any pending currency conversions, or comparisons to conversions that would be applied by issuers of the consumers' payment accounts. With that said, the systems and methods herein rely on technology to deliver additional information to consumers in connection with such transactions, via particular interfaces at the terminals, and choices where none had previously existed.

With that said, and as described above, in a typical DCC transaction, the manner in which a merchant (or their DCC provider (or conversion provider)) determines the native currency of the consumer may be faulty. For example, DCC providers typically determine the native currency of the consumer based on a lookup table that provides the name of the country in which the payment device was issued (a BIN lookup table). The DCC provider then infers the native currency based on the country or region of issuance. This may result in the consumer being offered a conversion into the wrong currency (e.g., a German consumer at a UK merchant may be offered to pay in Swiss Francs instead of Euros, etc.). This may be due to an error in the BIN lookup table, an operational error by the DCC provider, or the issuance of payment devices in multiple currencies from one country or region (e.g., a Swiss bank issuing cards in Euros, etc.).

In connection therewith, the systems and methods herein permit and/or provide a terminal (e.g., a POS or ATM terminal, etc.), and corresponding interface, with the appropriate native or home currency of the consumer. In particular, when a transaction is initiated by a consumer at a merchant and/or banking institution (using a payment account associated with the consumer), a request for a conversion offer to be used in the transaction is provided to a conversion provider (the DCC provider) and also to an issuer of the consumer's payment account (and/or a payment network associated with the issuer). The issuer (and/or a payment network associated with the issuer) responds with the consumer's native currency which may then enable the merchant and the DCC provider to offer a currency conversion in the appropriate currency, thereby improving performance of the terminal (as a computing device) in the consumer's, merchant's, and/or banking institution's experience (as a practical application).

In addition to the above, the issuer of the payment device/payment account associated with the consumer may assess fees or charges to the consumer based on (a) the currency of the transaction not being the consumer's native or home currency (e.g., the issuer (and/or a payment network associated with the issuer) may be required to convert the transaction amount from the merchant's currency to the consumer's native currency, etc.) and/or (b) the transaction occurring in a region or country other than the consumer's native region or country (e.g., foreign transaction fees (FTFs) (e.g., cross-border fee, etc.), etc.). Further, these fees may vary based on the currency and/or the location of the merchant (or banking institution or ATM) involved. Typically, these fees and charges are established in the account agreement between the issuer and the consumer and may include fixed amounts and/or an ad valorem fee. In a conversion option from the conversion provider (especially where the issuing bank charges FTFs), the consumer may not be aware that the amount they are agreeing to pay the merchant (or banking institution or ATM) is not inclusive of the fees and charges of the issuer.

The systems and methods herein permit and/or provide a terminal with an indication that the issuer may assess additional fees and charges on transactions initiated based on the conversion options from the conversion provider (as another practical application). In particular, when a transaction is initiated by a consumer at a merchant (using a payment account associated with the consumer), a request for a conversion offer to be used in the transaction is provided to a conversion provider and also to the issuer of the consumer's payment account (and/or the payment network associated with the issuer). The issuer (and/or the payment network or the conversion engine) will respond with a message informing the terminal that the issuer will assess an additional fee(s) and the amount (or estimated amount) of such fees, which amount can then be applied to the conversion option from the conversion provider, thereby improving performance of the terminal (as a computing device) and also the experiences of the consumer and the merchant.

Further, in some circumstances, pursuant to the rules of the payment network, for example, or the account owner's preference, the consumer should not be offered a conversion option from the conversion provider. For example, a prepaid travel card may be purchased by a consumer in their native region, using funds in their native currency to purchase the card and then loading onto the payment device funds in the currency of the travel destination (e.g., a US consumer traveling to Europe may buy a prepaid travel card in the airport, prior to leaving the US, where the consumer pays US dollars to a bureau de change to load the payment device with Euros in anticipation of their trip; etc.). At a terminal in Europe, then, the consumer 114 may be offered a conversion option from the conversion provider, because it believes that the payment device is denominated in the currency of the country or region it was issued (i.e., the U.S.). If the consumer mistakenly accepts the conversion offer, the consumer will have paid for currency conversion twice (once when loading fund to the payment account, and again through the conversion provider process).

The systems and methods herein permit and/or provide a terminal with an indication that the payment device may not be offered conversion options (whether due to the payment network's rules or the consumer's stated preference) (as still another practical application). In particular, when a transaction is initiated by a consumer (using a payment account associated with the consumer), a request for a conversion offer to be used in the transaction is provided to the conversion provider and also to the issuer of the consumer's payment account (and/or the payment network). The issuer (and/or the payment network or the conversion engine) is able to respond with a message informing the terminal that the payment device cannot be offered conversion options (rather than a conversion option at 324 in FIG. 3, for example). In this manner, the performance of the terminal (as a computing device) is improved along with experience of the consumer 114 and the entity associated with the terminal.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and without limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) receiving, from a terminal at an entity, a request for a conversion option for a transaction to a payment account initiated by a consumer at the terminal, the request including a transaction amount for the transaction in a first currency and an identifier associated with the payment account; (b) determining, by a conversion engine computing device, a charge rate for the payment account for conversion of the transaction amount to a second currency different from the first currency; (c) determining, by the conversion engine computing device, the conversion option for the transaction in the second currency based on at least a conversion rate for the first and second currencies and the charge rate; and (d) transmitting, by the conversion engine computing device, the conversion option to the terminal in response to the request, thereby permitting the terminal to present the conversion option to the consumer in connection with initiating the transaction to the payment account.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

In addition, as used herein, the term product may include a good and/or a service.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for use in providing conversion options to consumers at terminals associated with merchants and/or banking institutions in connection with transactions between the consumers and the merchants and/or the banking institutions, the system comprising:

a data structure including a conversion rate between a first currency and a second currency; and a payment network coupled to multiple issuers, each associated with multiple payment accounts, the payment network including a conversion engine computing device coupled to the data structure, the conversion engine computing device configured to:

receive, from a point-of-sale (POS) terminal associated with a merchant, a request for a conversion option for a transaction to one of the multiple payment accounts, initiated by a consumer at the POS terminal, the request prior to and sperate from authorization of the transaction, the request including a transaction amount for the transaction in the first currency and an identifier associated with the one of the multiple payment accounts;

in response to receiving the request for the conversion option from the POS terminal, identify an issuer associated with the one of the multiple payment accounts funding the transaction from the multiple issuers;

transmit, to the identified issuer of the one of the multiple payment accounts, an inquiry message for a charge rate to be applied by the issuer to the one of the multiple payment accounts for conversion of the transaction from the first currency to the second currency;

receive the charge rate from the identified issuer in response to the inquiry message;

retrieve the conversion rate from the data structure, wherein the conversion rate is an estimate, at a time of the request for the conversion option, of a conversion rate to be applied at clearing of the transaction;

determine the conversion option for the transaction in the second currency based on at least the transaction amount, the retrieved conversion rate and the charge rate, wherein the conversion option includes the transaction amount in the first currency and an estimated amount for the transaction in the second currency associated with the clearing of the transaction; and transmit the conversion option to the POS terminal in response to the request, thereby permitting the POS terminal to present the conversion option determined by the conversion engine computing device, along with a dynamic currency conversion (DCC) option received from a conversion provider including an amount for the transaction in the second currency, to the consumer in connection with the transaction, and permitting the consumer to initiate authorization of the transaction consistent with either the conversion option or the DCC option.

2. The system of claim 1, wherein the conversion engine computing device is further configured to:

convert the transaction amount for the transaction from the first currency to the second currency based on the conversion rate retrieved from the data structure; and apply the charge rate for the one of the multiple payment accounts to the converted transaction amount, to thereby determine the conversion option.

3. The system of claim 1, wherein the conversion engine computing device is further configured to determine the second currency based on a billing currency of the one of the multiple payment accounts and/or a payment network affiliated with the identified issuer.

4. The system of claim 1, further comprising the POS terminal, wherein the POS terminal is configured, by executable instructions, to:

transmit the request for the conversion option to the conversion engine computing device;

receive the conversion option from the conversion engine computing device in response to the request;

receive the DCC option from the conversion provider; and present the conversion option, along with the DCC, to the consumer.

5. The system of claim 1, wherein the data structure is included within the conversion engine computing device.

6. A computer-implemented method for use in providing conversion options to consumers at terminals of entities in connection with transactions between the consumers and the entities, the method comprising:

receiving, from a point-of-sale (POS) terminal at a merchant, a request for a conversion option for a transaction to a payment account, initiated by a consumer at the POS terminal, the request prior to and sperate from authorization of the transaction, the request including a transaction amount for the transaction in a first currency and an identifier associated with the payment account;

in response to receiving the request for the conversion option from the POS terminal, identifying, by a conversion engine computing device, an issuer of the payment account;

transmitting, by the conversion engine computing device, to the identified issuer of the payment account, an inquiry message for a charge rate to be applied by the]] issuer of the payment account for conversion of the transaction amount to a second currency different from the first currency;

receiving, by the conversion engine computing device, from the identified issuer of the payment account, the charge rate in response to the inquiry message;

determining, by the conversion engine computing device, the conversion option for the transaction in the second currency based on at least a conversion rate for the first and second currencies and the charge rate, wherein the conversion rate is an estimate, at a time of the request for the conversion option, of a conversion rate to be applied at clearing of the transaction; and transmitting, by the conversion engine computing device, the conversion option to the terminal in response to the request, wherein the conversion option includes the transaction amount in the first currency and an estimated amount for the transaction in the second currency associated with the clearing of the transaction, thereby permitting the terminal to present the conversion option determined by the conversion engine computing device, along with a dynamic currency conversion (DCC) option received from a conversion provider including an amount for the transaction in the second currency, to the consumer, and permitting the consumer to initiate authorization of the transaction consistent with either the conversion option or the DCC option.

7. The computer-implemented method of claim 6, wherein determining the conversion option includes:

converting the transaction amount for the transaction from the first currency to the second currency based on the conversion rate; and applying the charge rate for the payment account to the converted transaction amount.

8. The computer-implemented method of claim 6, further comprising determining a native currency of the payment account based on a billing currency of the payment account, wherein the second currency is the native currency.

9. The computer-implemented method of claim 8, wherein determining the conversion option further includes estimating the conversion option based on the estimate, at the time of the request for the conversion option, of the conversion rate to be applied at the clearing of the transaction.

10. The computer-implemented method of claim 6, further comprising retrieving the conversion rate from a data structure of a payment network associated with the payment account and/or from the identified issuer of the payment account.

11. The computer-implemented method of claim 10, wherein the data structure of the payment network includes a present clearing conversion rate for the payment network.

12. A non-transitory computer readable storage media comprising executable instructions for providing conversion options to consumers at terminals of entities in connection with transactions between the consumers and the entities, which when executed by at least one processor, cause the at least one processor to:
  receive, from a point-of-sale (POS) terminal at a merchant, a request for a conversion option for a transaction to a payment account, initiated by a consumer at the terminal, the request prior to and sperate from authorization of the transaction, the request including a transaction amount for the transaction in a first currency and an identifier associated with the payment account;
  in response to receiving the request for the conversion option from the POS terminal, identify an issuer of the payment account involved in the transaction;
  transmit, to the identified issuer, an inquiry message for a charge rate to be applied by the issuer of the payment account for conversion of the transaction amount to a second currency different from the first currency;
  receive, from the identified issuer of the payment account, the charge rate in response to the inquiry message;
  determine the conversion option for the transaction in the second currency based on at least a conversion rate for the first and second currencies and the charge rate, wherein the conversion rate is an estimate, at a time of the request for the conversion option, of a conversion rate to be applied at clearing of the transaction; and
  transmit the conversion option to the terminal in response to the request, wherein the conversion option includes the transaction amount in the first currency and an estimated amount for the transaction in the second currency associated with the clearing of the transaction, thereby permitting the terminal to present the conversion option, along with a dynamic currency conversion (DCC) option received from a conversion provider including an amount for the transaction in the second currency, to the consumer, and permitting the consumer to initiate authorization of the transaction consistent with either the conversion option or the DCC option.

13. The non-transitory computer readable storage media of claim 12, where the executable instructions, when executed by the at least one processor, further cause the at least one processor to determine a native currency of the payment account based on a billing currency of the payment account and/or a payment network affiliated with the identified issuer of the payment account, wherein the second currency is the native currency.

14. The non-transitory computer readable storage media of claim 13, where the executable instructions, when executed by the at least one processor in connection with determining the conversion option, cause the at least one processor to:
  convert the transaction amount for the transaction from the first currency to the second currency based on the conversion rate; and
  apply the charge rate for the payment account to the converted transaction amount.

15. The non-transitory computer readable storage media of claim 14, where the executable instructions, when executed by the at least one processor, cause the at least one processor to transmit an authorization request for the transaction to the identified issuer of the payment account.

* * * * *